July 7, 1964  R. R. STREBINGER ETAL  3,139,894
POWER TURBINE SPEED CONTROL FOR TURBOPROP ENGINES
Filed March 30, 1960
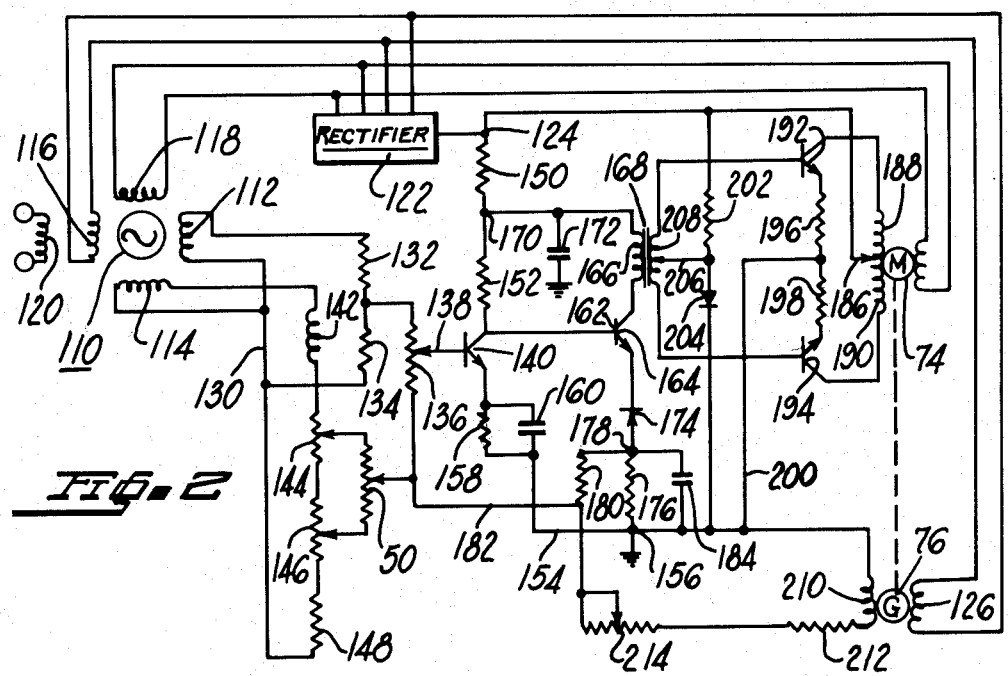
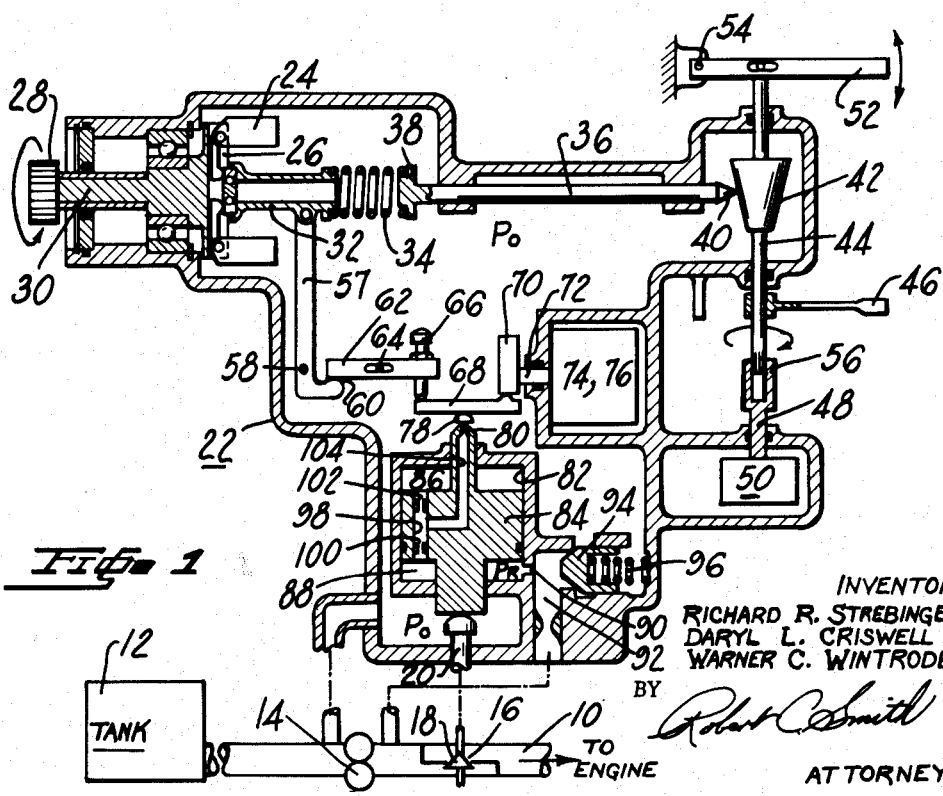
INVENTORS:
RICHARD R. STREBINGER
DARYL L. CRISWELL
WARNER C. WINTRODE
BY
ATTORNEY 3,139,894
POWER TURBINE SPEED CONTROL FOR TURBOPROP ENGINES
Richard R. Strebinger, Daryl L. Criswell, and Warner C. Wintrode, South Bend, Ind., assignors to The Bendix Corporation, a corporation of Delaware
Filed Mar. 30, 1960, Ser. No. 18,722
9 Claims. (Cl. 137—34)

This invention relates to governors and more specifically to a governing system for gas turbine engines.

The governing system described herein has particular utility for use with gas turbine engines which drive load devices such as helicopter rotors. Such rotors may have underdamped or oscillatory dynamic characteristics which present unusually difficult problems in governing. When such engines are used in conjunction with such loads it has been determined that the dynamic characteristics of the governing system must be carefully selected to effect adequate speed governing without excessively aggravating the oscillatory tendency of the load. It has therefore been determined that an effective governing system for such an engine and load is one using a combination of proportional and integrating governing techniques. The proportional governor has the desirable characteristic of fairly fast response but with a certain amount of "droop" or error while the integrating governor will continually act to maintain the engine speed at the exact set point but is comparatively slow in its action. It is therefore an object of the present invention to provide a governing system having the advantages of both proportional and integrating governors including means for varying the gain of both systems and the major time constants of the governing system.

It is another object of the present invention to provide a governing system which accomplishes the above object and which further provides servo output means and means for varying the time constant of the combined outputs of the proportional and integrating systems by varying the response of the servo.

It is a further object of the present invention to provide a governing system which accomplishes the above objects and in which means are provided in the proportional system for varying the speed request signal with changes in another condition such as load.

It is a further object of the present invention to provide a governing system which accomplishes the above objects and which is comparatively simple in its structure and light in weight.

Other objects and advantages will become apparent from the following specification taken in connection with the accompanying drawings in which:

FIGURE 1 is a sectional drawing of the mechanical proportional governing system plus the servo output section for operating the metering valve; and FIGURE 2 is a schematic drawing of the electrical integrating governor system.

Referring now to FIGURE 1, fuel is supplied to an engine (not shown) through a fuel conduit 10 from a tank 12, the fuel being pressurized by means of a pump 14. The effective area of a metering orifice 16 is varied by means of a movable valve element 18. The valve element 18 is controlled by means of a shaft 20 driven by means of the mechanical unit 22.

The unit 22 includes a proportional all-speed governor including a pair of flyweights 24 which are rotatable on a table 26, driven by the engine through a gear 28 and shaft 30. The force of the flyweights 24 is exerted against a sleeve member 32 and this force is opposed by means of speed selecting means including a governor spring 34. The compression of spring 34 is varied through axial movement of a shaft 36 carrying a spring retainer 38. Shaft 36 contains a cam follower surface 40 which rides on a cam 42 rotatable on a shaft 44 by means of a manually positioned throttle member 46. As throttle member 46 is rotated, it also rotates, through a shaft 48, a throttle potentiometer 50, to be described in detail below. The shaft 44 is movable axially by means of the lever 52 which is pinned to a stationary member at numeral 54 and which lever is movable in response to changes in load request, such as a change in the pitch of the propeller. Inasmuch as the shaft 44 is connected to the shaft 48 through a lost motion connection 56 there is no axial movement of the shaft 48 and hence, no change in the position of the slider on the throttle potentiometer 50 with changes in load request.

Movement of the sleeve member 32 results in movement of the upper end of a lever 57 which is pinned to the housing of unit 22 at a fulcrum point 58. Movement of lever 57 results in the transfer of this motion through the contacting surface 60 of said lever to a lever 62 which is arranged to pivot around a fulcrum 64. The opposite end of lever 62 carries an adjustable screw 66 which contacts one end of a floating link 68. The opposite end of link 68 is positioned by means of a cam member 70 which is rotatable on a shaft 72 driven by an electric motor-generator unit 74, 76. Link 68 carries a half-ball pilot valve 78 which controls the flow through an orifice 80.

The link 68 and the servo pilot valve 78 act to control a servomotor consisting of a cylinder 82 formed within the housing 22 and containing a piston 84 dividing said cylinder into a chamber 86 and a second chamber 88. Chamber 88 communicates through a port 90 with a conduit 92 connected to receive fuel from the downstream side of pump 14. Fuel in chamber 88 and conduit 92 is maintained at a desired pressure by means of a regulating valve 94 which is urged in a closing direction by means of a spring 96. This regulated pressure ($P_R$) acts against the bottom of piston 84 in chamber 88 and communicates with chamber 86 through a conduit 98 having a restriction 100 and a restriction 102. At a position between the two restrictions 100 and 102 the conduit 98 communicates with an additional conduit 104 which terminates in the servo orifice 80. It will be observed that the effective area over which the fluid pressure acts on piston 84 from chamber 88 is considerably smaller than that acting on the piston from chamber 86. The pressure downstream of orifice 80, i.e., the pressure operating generally within the interior of the housing 22 is pump inlet pressure ($P_O$).

The electrical system shown in FIGURE 2 drives the motor-generator 74, 76 shown in FIGURE 1. The system of FIGURE 2 receives its energy from a two-phase engine driven generator 110 having two pairs of two-phase windings. Windings 112 and 114 are positioned 90 electrical degrees apart as are windings 116 and 118. Winding 120 is an indicator winding for supplying a speed signal to an instrument panel. Windings 116 and 118 supply alternating current to a rectifier element 122 which may consist of two banks of full wave rectifiers and this rectifier element will make available at terminal 124 a direct current voltage having a relatively small amplitude of alternating current ripple.

One side of each of windings 112 and 114 is connected to a common conductor 130. The opposite side of winding 112 is connected to wire 130 through a voltage dividing network consisting of resistors 132 and 134. Connected to the midpoint between these resistors is a potentiometer 136 having its slider 138 connected to the base of a transistor 140. The opposite side of winding 114 is connected to conductor 130 through a reactor 142, potentiometers 144 and 146 and a resistor 148. The sliders of potentiometers 144 and 146 are connected to opposite ends of the potentiometer 50 which serves as the speed request potentiometer for the electrical system of FIGURE 2. Potentiometers 144 and 146 provide adjustments for the maximum speed reference point and the minimum speed reference point respectively. Assume, for the moment, that a voltage of a particular phase is generated in winding 112 and that this voltage appears across the resistors 132 and 134. Assume also that the voltage generated in winding 114 lags that in winding 112 by 90 electrical degrees. There will then be an additional lag of slightly less than 90 electrical degrees introduced in the circuit of winding 114 because of the inductive reactance of reactor 142. For this reason the speed reference signal selected by the slider of potentiometer 50 will be substantially 180 degrees out of phase with the speed signal appearing at the terminal between resistors 132 and 134. When these signals are equal they will cancel and there will be no speed error signal delivered to the base of transistor amplifier 140. Should the speed signal be greater than the reference signal there will be an error signal of the same phase as the speed signal and of a magnitude proportional to the magnitude of the error supplied to the base of transistor 140. If the speed signal is below the reference value, the error signal will then be of the phase of the reference signal selected by potentiometer 50 and of a magnitude proportional to the magnitude of the difference between these two signals. A similar speed error signal producing system has been described in somewhat greater detail in application Serial No. 796,480 filed in the name of Leon H. Bishop (common assignee) now Patent No. 3,082,354. The collector voltage for transistor 140 is supplied from the rectifier 122 to terminal 124 and through a voltage divider circuit consisting of resistors 150 and 152 to the collector. The emitter circuit is connected with a conductor 154 which is grounded at terminal 156 and the emitter is maintained at a desired voltage level above ground by means of a resistor 158 having a capacitor 160 connected in parallel therewith to permit by-passing of a certain amount of alternating current ripple, as is well known in the art. The collector of transistor 140 is also connected to the base 162 of a transistor 164. The collector of transistor 164 is connected to one end of the primary winding 166 of an interstage coupling transformer 168 and the opposite end of this winding is connected to a terminal 170 at the junction between resistors 150 and 152. A capacitor 172 also effectively connected to this terminal operates to by-pass some of the alternating current ripple from the rectifier 122 to ground. In the emitter circuit of transistor 164 are a zener diode 174 and a resistor 176 which operate to maintain the emitter at a regulated voltage level above the ground terminal 156. Connected to a terminal 178 between the zener diode 174 and the resistor 176 is a feedback resistor 180 which is connected by means of a wire 182 to the slider of potentiometer 50. It will thus be seen that resistor 180, as connected to the potentiometer 50, effectively closes a feedback loop to the base of transistor 140. Also connected in the emitter circuit of transistor 164 is a filter capacitor 184. The variable phase winding of motor 74 is effectively split by means of a center-tap 186 into two windings 188 and 190 which are respectively connected to the collector circuits of transistors 192 and 194. The emitter circuits of transistors 192 and 194 which are connected to push-pull are connected to the ground terminal 156 through resistors 196 and 198 respectively and a conductor 200. Also connected between the terminal 124 and the ground line 154 are the resistor 202 and a zener diode 204. Connected to the junction between resistor 202 and the diode 204 is a conductor 206 connected with the midpoint of interstage transformer secondary winding 208. The secondary winding 208 is connected to the base of each of transistors 192 and 194. The diode 204 connected in this circuit serves two functions, first, to establish a bias voltage on the base of the output transistors to insure that the transistors will not be operating in a dead band; and second, it effectively compensates for the temperature characteristics of the base-emitter junction of transistors 192 and 194.

The damping generator 76 which is driven by the motor 74 includes, in addition to the exciting winding 126, a generating winding 210 in which is generated a voltage of magnitude and phase proportional to the speed and direction of rotation of said motor. This voltage is connected through a resistor 212 and a potentiometer 214 to a terminal on one end of the feedback resistor 180 which is connected through conductor 182 to the potentiometer 50. This damping generator signal then is adjustable by means of a slider 214 to provide the desired amount of damping at the input of transistor 140 to assure stable operation of the amplifier and the proper damping of the electrical governing system.

In understanding the operation of the system described herein, it will be remembered that gear 28 and the two-phase generator 110 are driven by the associated engine in direct proportion to the speed of said engine. It will first be assumed that the throttle lever 46 is positioned such that all of the forces in the system are stabilized and the system is not requesting a change in fuel flow. Under these conditions the flyweight force exerted by weights 24 is equal and opposite to the spring force of governor spring 34 and levers 57 and 62 maintain a constant force on the link 68. At the same time, the speed reference signal selected on potentiometer 50 is equal and opposite to the speed signal appearing across resistor 134 and there is no input to the transistor 140. Under these circumstances, there will be no signal tending to rotate the motor 74 and therefore cam 70 is maintained in its position and no force is available to cause a movement of the servo valve 78 with respect to the orifice 80. The servo piston 84 is then stabilized and valve 18 is maintained in position. Upon a request for increased engine speed, the throttle member 46 will be rotated in a direction to cause the cam 42 to present greater rise to the follower 40 and shaft 36 thus compressing spring 34 such that the force produced thereby is greater than that of flyweights 24 resulting in the transfer through levers 57 and 62 of a force on the left hand end of link 68 causing valve 78 to be closed and thereby causing a pressure increase in chamber 86 driving piston 84 in a downward direction and urging valve member 18 downwardly thereby increasing the effective area of orifice 16. At the same time the movement of the throttle member 46 will cause a rotation of potentiometer 50 in a direction to increase the magnitude of the reference signal in relation to the speed signal and a speed error signal of the proper polarity to indicate an underspeed condition is fed to the transistor amplifier 140. This signal is supplied to the transistor 162 and the push-pull transistor output stage including transistors 192 and 194 where it is further amplified and is supplied to the windings 188, 190 in a proper phase relationship to cause the motor 74 to rotate the cam 70 in a direction to force the right hand end of link 68 downwardly and tending to move the servo valve 78 closer to its orifice 80. In the usual operation the proportional system will be much faster than the integrating system and there actually would be an appreciable overshooting of the speed set point by the proportional system before the integrating system could operate were it not for the effect of the bleed 102 which tends to slow to some degree the response of the servo piston 84. Bleed 102 may be made removable and replaceable with any desired size bleed, depending upon the time constant required for a particular application. With the operation of bleed 102, the mechanical system will tend to bring the control close to but not exactly on the set point in a comparatively short period of time. During this time, the electrical system is operating to cause a rotation of the motor 74 and the cam 70 in such manner as to continually eliminate any error in the system whatever. Should the mechanical system overshoot slightly, there will immediately be sensed in the electrical system a speed error of the opposite polarity from that previously sensed, and the motor will begin rotating in the opposite direction.

A proportional all-speed governor like that shown in FIGURE 1 has a characteristic such that for a given increase in load, it will not increase fuel flow at the same speed, but will lose speed during the time it is picking up the increased load. It will also tend to stabilize at a somewhat slower speed than that previously selected. For this reason, it is necessary to schedule the governor to operate on an entirely different "governor break" line in order to avoid a loss in speed with an increased load or an increase in speed from a decreased load. For this reason, a request for change in load results in a change in the axial position of cam 42 and a change in the compression of the governor spring 34 with no requested change in speed whatever. Were the cam 42 not employed in a proportional system to effect a resetting of the governor spring 34 for changes in load, the integrating section would ultimately stabilize the engine speed at the desired value as set on potentiometer 50; however, the variation in speed during the transition and the time required for the overall system to respond would be much greater.

While only one embodiment has been shown and described herein, modifications may be made to suit the requirements of any particular application without departing from the scope of the present invention.

We claim:

1. A governing system for an engine comprising a fuel conduit, a fuel valve in said conduit, servomotor means for controlling the position of said fuel valve, a servo pilot valve for controlling movement of said servomotor and means for controlling said servo pilot valve including a link to which said servo pilot valve is operably connected, a cam effective to position one end of said link, an electrical integrating governor system effective to position said cam including electrical motor means controlling the position of said cam, a two-phase alternator device driven by said engine for producing a voltage in one of said phases whose amplitude varies with the speed of said engine, reactance means for receiving the voltage in the other of said phases and converting said voltage to a signal of substantially constant amplitude and phase in substantial opposition to said first named voltage, means comparing said voltages to produce a speed error signal, amplification means for driving said electrical motor means, and damping generator means driven by said motor means for providing a damping signal to said amplification means; a lever system effective to position the other end of said link, and a proportional governing system for controlling said lever system including a flyweight device responsive to the speed of said engine, a spring opposing the force of said flyweight device; and operator-operated means for varying the force exerted by said spring and for varying the amplitude of said second named voltage.

2. A governing system as set forth in claim 1 wherein said operator-operated means includes a spring retainer for said spring, an actuating shaft, a throttle lever for rotating said actuating shaft, a cam on said shaft for moving said spring retainer, and a potentiometer whose slider is movable with said throttle lever for varying the amplitude of said second named voltage to produce a reference signal.

3. A governing system as set forth in claim 2 wherein said actuating shaft is movable axially with changes in the loading of said engine and said cam is contoured axially for changes in load conditions.

4. A governing system as set forth in claim 1 wherein said servomotor means includes a cylinder, a piston in said cylinder effective to divide said cylinder into a first chamber and a second chamber, said first chamber communicating with a source of high fluid pressure, passage means communicating said first chamber with said second chamber and each of said chambers with a source of low fluid pressure, a restriction in said passage means between each of said first and second chambers and said low fluid pressure source, said pilot valve being operable to control communication between said low fluid pressure source and said passage means.

5. A governing system for an engine comprising a fuel conduit to said engine, a fuel valve in said conduit, servomotor means for controlling the position of said fuel valve, and means for controlling said servomotor means including a floating link and a pilot valve attached to said link, a proportional all-speed governor adapted to exert a force on said link including an adjustable speed responsive device for producing a force varying with the speed of said engine and speed selecting means responsive to varying load conditions for producing a force in opposition to said speed force, and an integrating all-speed governor adapted to exert a force on said link including a cam in contact with said link, means driven by said engine for producing a voltage whose amplitude varies with the speed of said engine, means producing a voltage whose amplitude is proportional to a desired speed and for comparing said voltages to produce a speed error signal, amplification means for amplifying said speed error signal, and an electric motor driven by said amplification means for positioning said cam.

6. A governing system as set forth in claim 5 wherein said servomotor means includes a cylinder, a piston in said cylinder effective to divide said cylinder into a first chamber and a second chamber, said first chamber communicating with a source of high fluid pressure, passage means communicating said first chamber with said second chamber and each of said chambers with a source of low fluid pressure, a restriction in said passage means between each of said first and second chambers and said low fluid pressure source, said pilot valve being operable to control communication between said low fluid pressure source and said passage means whereby the dynamic response of said servo valve is established by the effective areas of said restrictions.

7. A governing system for an engine as set forth in claim 5 wherein means are provided for varying the gain of said proportional all-speed governor, and said amplification means includes means for varying the gain and for varying the time constant of said integrating governor.

8. A governing system for an engine as set forth in claim 5 wherein a damping generator is driven by said electric motor having its output connected to said amplification means.

9. A governing system for an engine as set forth in claim 5 wherein said speed error voltage producing means includes a two-phase generator wherein one phase lags the other phase by approximately ninety electrical degrees, and said one phase is impressed across a highly inductive circuit whereby the voltage output of said circuit is substantially constant with changes in engine speed and lags said other phase by approximately 180 electrical degrees and voltage dividing means are supplied for selecting a desired voltage level from said substantially constant voltage as a speed reference signal, and means comparing said voltages to produce a speed error signal.

References Cited in the file of this patent

UNITED STATES PATENTS

| | | |
|---|---|---|
| 2,358,894 | Volet | Sept. 26, 1944 |
| 2,701,577 | Booth | Feb. 8, 1955 |
| 2,772,378 | Farkas | Nov. 27, 1956 |
| 2,829,662 | Carey | Apr. 8, 1958 |
| 2,941,601 | Best | June 21, 1960 |
| 2,960,629 | Oldenburger | Nov. 16, 1960 |
| 2,966,161 | McCombs | Dec. 27, 1960 |